Jan. 17, 1967  M. FRANKEL  3,298,556
MEASURING DEVICE
Filed April 23, 1964  2 Sheets-Sheet 1
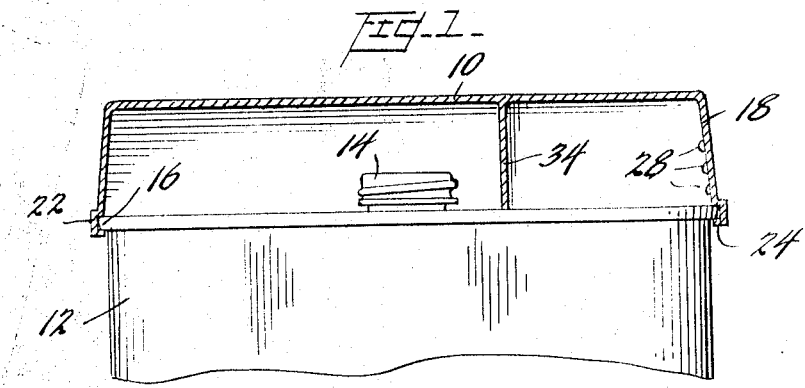
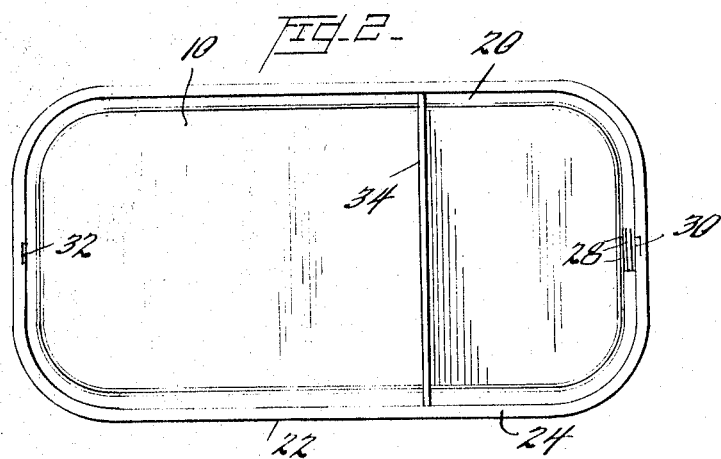
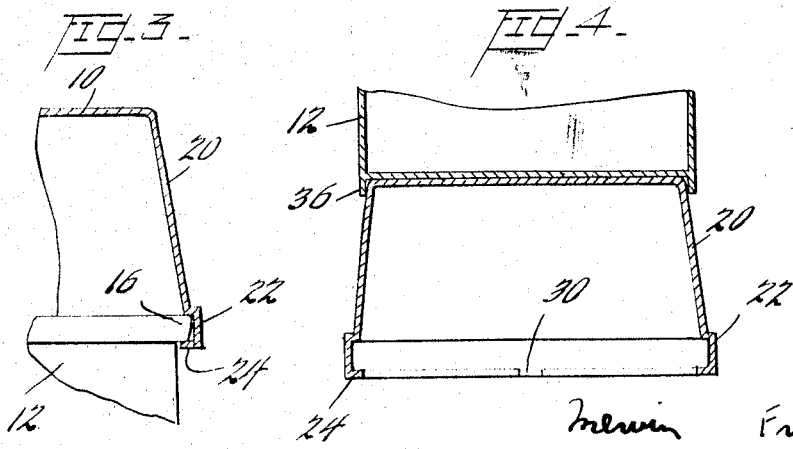
INVENTOR
Mervin Frankel
BY Donald R. Bahr
ATTORNEY Jan. 17, 1967   M. FRANKEL   3,298,556
MEASURING DEVICE
Filed April 23, 1964   2 Sheets-Sheet 2
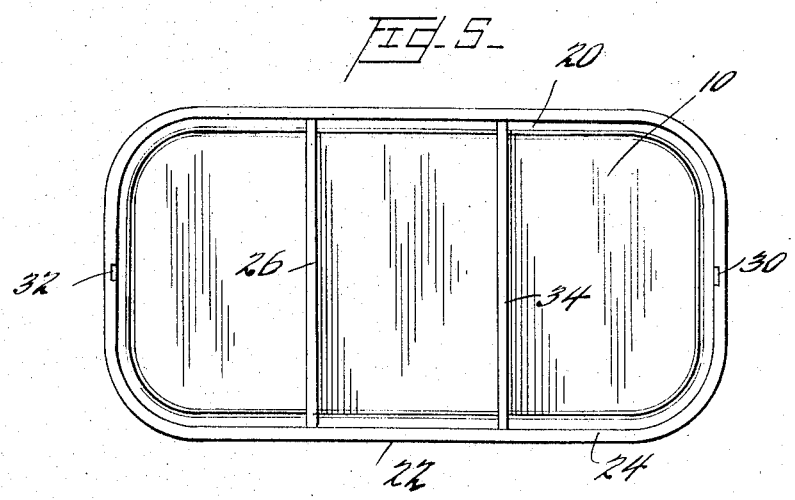
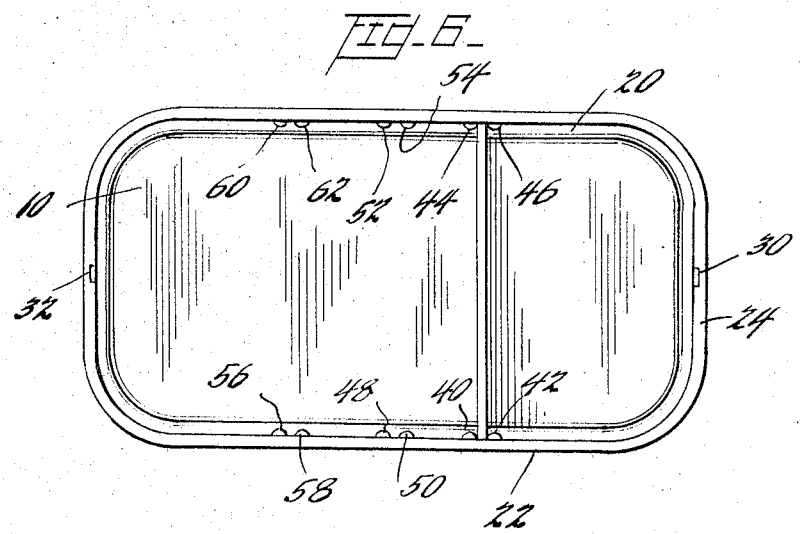
INVENTOR
Mervin Frankel
BY Donald R. Bahr
ATTORNEY

3,298,556
MEASURING DEVICE
Merwin Frankel, Scarsdale, N.Y., assignor to Geigy Chemical Corporation, Greenburgh, N.Y., a corporation of Delaware
Filed Apr. 23, 1964, Ser. No. 362,142
8 Claims. (Cl. 220—23.83)

The present invention relates to a snap-on measuring device for a merchandising package. This measuring device enhances the display qualities of the merchandising package and provides a means for measuring the contents of said package.

In merchandising certain products, such as insecticides, it is often desirable to provide a convenient means for accurately measuring small quantities of the product. It is likewise desirable that the measuring device be adapted to measure more than one size aliquot. The measuring means should also be securely attached to the consumer container in such a way that it amounts to a sales asset.

While measuring devices which are secured to consumer containers are generally known, the known measuring devices provide only a singular measuring space. These known devices also provide additional problems in that they must be taped or glued to the consumer container. This procedure is generally undesirable in that labor must be provided for attaching; shipping problems arise due to the additional space taken up by the measuring device and an unsightly composite package results.

The measuring device of the subject invention overcomes these difficulties in that it can be attached quickly and easily to the consumer container, it does not protrude from the consumer container, therefore no shipping problems result, it enhances rather than detracts from the appearance of the composite package and is adapted to dispense more than one size aliquot. The subject measuring device is preferably made of plastic to provide the resiliency necessary for its attachment, and to allow for easy fabrication.

An object of this invention is to provide a measuring device which is readily attached to the consumer container.

Another object of this invention is to provide a measuring device which will enhance the sales potential of the consumer container.

Numerous other objects and advantages of the invention will be apparent as it is better understood from the following description, which, taken in connection with the accompanying drawings, discloses a preferred embodiment thereof.

Referring to the drawings:

FIGURE 1 is a fragmentary view through the top portion of the consumer container and measuring device.

FIGURE 2 is a vertical sectional view showing the inside of the measuring device.

FIGURE 3 is an enlarged fragmentary view through the top portion of the consumer container and the locking rim of the measuring device showing the locking means whereby the measuring device is attached to the consumer container.

FIGURE 4 is a fragmentary view through the measuring device showing the stacking potential of the consumer container with the measuring device attached.

FIGURE 5 is a vertical selectional view showing the inside of the measuring device divided into three measuring areas by two dividing walls.

FIGURE 6 is a vertical sectional view showing another embodiment of the invention wherein the volume of the measuring area can be varied.

Referring to FIGURE 1 it can be seen that the composite package consists of a measuring device 10 which is secured to the consumer container 12. Consumer container 12 is of a conventional type, having a cap portion 14 and an upper bead 16.

Measuring device 10 consists of an end wall portion 18, a side wall portion 20, an inner wall portion 34 and a locking rim 22. The inner wall portion 34 is adapted to divide the inner volume of measuring device 10 to a desired value. A series of markings 28 on the inner wall of measuring device 10 may be provided for to allow for fractional measurement.

A plurality of measuring spaces may be provided for in the inner volume of measuring device 10 by the incorporation of additional inner wall portions. For example, see FIGURE 5 with additional wall portion 26.

As is shown in FIGURE 3, the lower extremity of locking rim 22 has a ridge portion 24 which is adapted to slip over bead 16 of consumer container 12 and thereby secure measuring device 10 to consumer container 12. The inner edge of ridge 24 is provided with a pair of slits 30 and 32 which permit the drainage of any liquid that might be trapped in locking rim 22 after use of measuring device 10 as a liquid measure. Slits 30 and 32 likewise permit the flexing of ridge 24 and locking rim 22 when pressure is applied to wall portions 18 and 20. This inherent flexibility allows the easy positioning of ridge 24 over the upper bead 16 of consumer container 12, and as such permits the easy removal and replacement of measuring device 10 on consumer container 12.

As is shown in FIGURE 4, the upper edge of side wall 18 is of such size that it is adapted to fit on the inner periphery of the lower bead 36 of the consumer container 12. This feature permits the stacking of a plurality of merchandising packages to create an attractive sales display and provides for a means for making maximum use of available shelf space.

It can be readily seen that dividing walls 34 and 26 can be positioned at any point on the inside of measuring device 10 or can be eliminated entirely so as to provide the desired size measuring volume. Likewise it can be seen that measuring device 10 is adapted to either liquid or dry measurement.

FIGURE 6 shows another embodiment of the invention, incorporating a moveable wall portion 38, which is held in place by pairs of oppositely disposed locking ridges 40–60. The inner volume can be varied by moving wall portion 38 to various pairs of opposing locking ridges 40–60. It is obvious that any number of pairs of locking ridges 40–60 can be provided for to make the measuring volume variable in any desired increment, and that more than one dividing wall can be utilized to provide a plurality of measuring areas.

Measuring device 10 can be made from any suitable material but it is preferably made of a flexible plastic which is adapted to molding techniques. There are no square corners in measuring device 10 and as such it is readily cleaned upon use.

The addition of measuring device 10 to consumer container 12 is also advantageous in that it provides a space between itself and the consumer container wherein advertising or instructional material can be incorporated into the merchandising package and as such easily transported and made available to the ultimate consumer. The addition of measuring device 10 to consumer container 12 is also advantageous in that by such an addition the aesthetic qualities of the composite merchandising package are enhanced. This effect is achieved in that additional color(s) may be added to the composite package and height is added to the overall package line.

The invention with its attendant advantages may be understood from the foregoing description. It is apparent that various changes may be made in the form, construction and arrangement of the parts without departing from the spirit and scope of the invention or sacrificing all of its material advantages, the form hereinbefore described being merely a preferred embodiment thereof.

What is claimed is:

1. A merchandising package comprising a rectangular consumer container having body walls and top and bottom members which are connected to the body walls by integral upper and integral lower beads which are formed from the connected members and body walls; a measuring member which has the same general horizontal cross sectional shape as said container, and having a top connected to tapered body walls to form an inverted U-shaped cross section, the inside of which measuring member is divided into fractional spaces by at least one dividing wall, the lower extremities of the tapered body walls of said measuring member being formed into a locking rim comprising a groove into which the upper bead of the consumer container is adapted to fit, and a ridge which is adapted to slip over the upper bead of the consumer container and engage the body walls of the consumer container, the ridge portion of the locking rim being provided with drainage slits which allow the drainage of entrapped liquid from said locking rim.

2. The merchandising package of claim 1 wherein the ridge portion of the locking rim contains two oppositely disposed drainage slits.

3. The merchandising package of claim 1 wherein the measuring member is divided into two measuring areas by a single dividing wall and the ridge section of the locking rim contains two oppositely disposed drainage slits.

4. The merchandising package of claim 1 wherein the measuring member is divided into three measuring areas by two dividing walls and the ridge section of the locking rim contains two oppositely disposed drainage slits.

5. A merchandising package comprising a rectangular consumer container having body walls and top and bottom members which are connected to the body walls by integral upper and integral lower beads which are formed from the connected members and body walls; a measuring member which has the same general horizontal cross sectional shape as the consumer container, and having a top connected to tapered body walls to form an inverted U-shaped cross section, the inside of which measuring member is divided into fractional spaces by at least one moveable dividing wall, the lower extremities of the tapered body walls of said measuring member being formed into a locking rim comprising a groove into which the upper bead of the consumer container is adapted to fit, and a ridge which is adapted to slip over the upper bead of the consumer container and engage the body walls of the consumer container, the ridge portion of the locking rim containing drainage slits which allow the drainage of entrapped liquid from said locking rim.

6. The merchandising package of claim 2 wherein the ridge portion of the locking rim contains two oppositely disposed drainage slits.

7. The merchandising package of claim 5 wherein the measuring member is divided into two measuring areas by a single moveable dividing wall and the ridge section of the locking rim contains two oppositely disposed drainage slits.

8. A removeable measuring member for use in combination with a consumer container, said consumer container having body walls and top and bottom members which are connected to the body walls by integral upper and integral lower beads which are formed from the connected members and body walls, said measuring member being adapted to snap on to said container by means of said upper bead of said container, said measuring member having the same general horizontal cross sectional shape as said container, and having a top connected to member body walls to form an inverted U-shaped cross section, the lower extremities of the body walls of said measuring member being formed into a locking rim comprising a groove into which the upper bead of consumer container is adapted to fit, and a ridge which is adapted to slip over the upper bead of the consumer container, the inside of which measuring member is divided into fractional spaces of differing capacities by at least one vertical dividing wall which extends from the top of said member to the upper edge of said groove.

References Cited by the Examiner

UNITED STATES PATENTS 3,112,824   12/1963   Lemelson _____ 220—23

LOUIS G. MANCENE, *Primary Examiner.*

THERON E. CONDON, *Examiner.*

GEORGE T. HALL, *Assistant Examiner.*